United States Patent Office 2,924,641
Patented Feb. 9, 1960

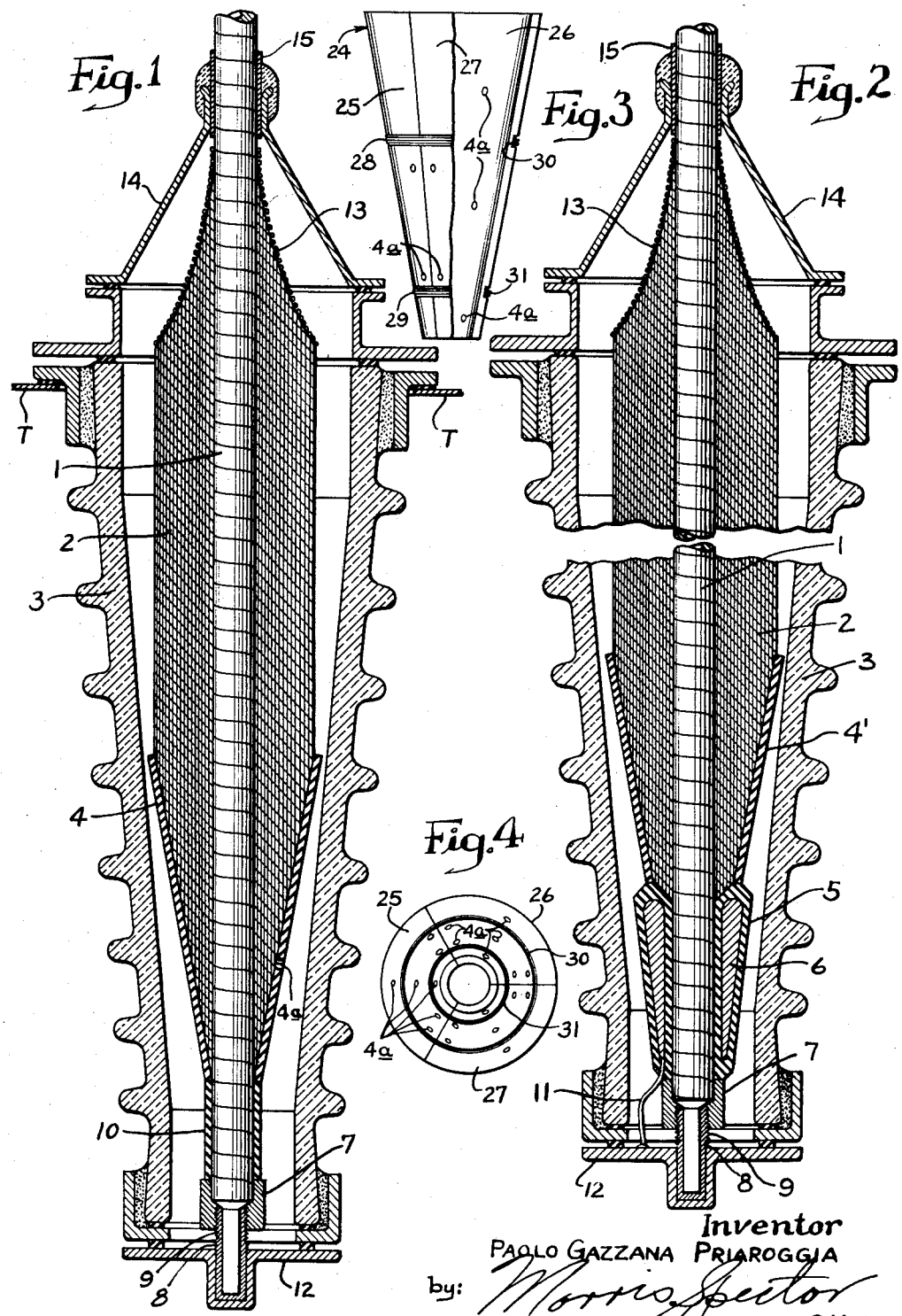

2,924,641

CONSTRUCTION OF SEALING ENDS FOR HIGH TENSION ELECTRIC CABLES

Paolo Gazzana Priaroggia, Milan, Italy, assignor to Pirelli Societa per Azioni, Milan, Italy Application June 5, 1956, Serial No. 589,437

Claims priority, application Italy July 8, 1955

15 Claims. (Cl. 174—73)

This application is a continuation-in-part of my co-pending application Serial No. 424,729 filed April 21, 1954.

This invention relates to an improvement in the construction of the sealing ends for high tension electric cables.

It is known that the insulation of the sealing ends of high tension electric cables may be built up by hand, at the place of installation, by wrapping onto the cable core (or insulated conductor) insulating tapes or sheets of insulating paper, or directly inserting onto the end of the cable core one or more prefabricated paper tubes. There is thus obtained an insulating sleeve which is then completed by the application of what is known in the cable art as "field shields," which may be electrodes or screens metallically connected to ground or to the cable conductor as the case may be. The unit is then surrounded by an insulating covering of porcelain or the like.

In the conventional technological practice, the ends of cables to be sealed may have to be in various positions as required by dimensions or other special requirements. For instance, in the case of direct entry of a high tension cable into a transformer, it may be desirable to install an overturned terminal or bushing. In such a structure, the insulating paper tubes, owing to their own weight, have a tendency to slide downwardly, and therefore impair the structure of the insulating sleeve. Moreover, if the external insulator housing is conical, the paper tubular insulation, moving downwardly, dangerously approaches the inner surface of the outer insulating housing and may impede the free passage of the oil or of the gas where this is needed.

When the outer insulator housing is of a decidedly conical shape the lower end of the applied paper tube must be tapered. This end happens to be in a zone which is not screened but is electrically stressed and therefore presents certain problems.

It is one of the objects of the present invention to provide means for supporting the applied insulating sleeve against downward movement, particularly in the case of an overturned sealing end wherein the outer insulator housing is of an approximately conical shape. In accordance with the preferred embodiment of the present invention, the support for the sleeve is in the shape of a truncated cone. It may be in the form of a single piece or, for easier assembly, of several pieces which together form a single cone and are bound together. The truncated supporting cone is, in some cases, perforated in order to allow the free access of insulating fluid to and from the sleeve that surrounds the cable core.

It is a further object of the present invention to provide a high voltage cable sealing end wherein the support above mentioned is of insulating material having high dielectric strength. This is important in a structure of the above mentioned character wherein the support is in an electric field and is subjected to high electric stresses and therefore cannot be made of metal. One preferred insulation for the support is a casting of synthetic resins, preferably of the ethoxylinic type. Other suitable materials are bakelized cardboard, or high dielectric strength porcelain or glass.

The attainment of the above and further objects of the present invention will be apparent from the following specification taken in conjunction with the accompanying drawings forming a part thereof.

In the drawings:

Fig. 1 is a longitudinal sectional view through a cable sealing end embodying the present invention; and Fig. 2 is a similar sectional view showing a modified form of sleeve support in the cable sealing end;

Fig. 3 is a front view, in half section, of a modified form of truncated cone for supporting the insulating sleeve; and Fig. 4 is a bottom plan view of the structure thereof.

In the drawings like reference numerals designate like parts throughout.

Fig. 1 shows the sealing end of a high voltage cable wherein a cable core 1 of a high voltage oil-filled or gas filled cable has direct entry into a transformer. In this case there is installed in the transformer an overturned terminal. The cable core 1 has a paper tube 2 in the form of an insulating sleeve applied thereto at the sealing end thereof, as is conventional, which then extends into an external insulator 3 of porcelain, which external insulator is of the general shape of a truncated cone mounted in inverse position to extend downwardly into a transformer housing T. The external porcelain insulator 3 is filled with insulating oil or gas. The lower end of the paper tube or tubes 2 is tapered or pencilled downwardly and inwardly from a maximum outer diameter of the paper tube to approximately the diameter of the cable core 1. The sleeve 2 is supported by a truncated cone 4 the lower end of which may rest on a sleeve 10 of the same material as the supporting cone 4, and which is in turn supported by a metallic threaded ring 7 which is screwed at 9 on a ferrule 8 that is compressed or otherwise electrically and mechanically connected over the end of the cable core conductor. The supporting cone 4 is preferably made of ethoxylinic resins with suitable hardening agents known in the trade under the trademark "Araldit," to which may have been previously added inorganic excipients such as powdered quartz, kaolin, or the like. If desired, the ethoxylinic resins with the hardening agents added, but devoid of inorganic fillers, may be used. These resins may be used to impregnate under vacuum (inside a mold) an insulating porous structure of paper, fiberglass, silk, cotton, asbestos, or the like, which is of the shape of the insulating supporting cone 4 and which within the mold acts as a skeleton for producing the support 4, and which structure or skeleton is ultimately itself embedded in the casting resin. The composition of the support 4 may be any of the compositions described in my pending applications Serial Nos. 550,741 or 424,729, and the method of making the same may be that described in my pending application Serial No. 550,741. The composition is free of voids and has a high tenacity for objects that may be embedded therein.

The support 4 may, optionally, be perforated as indicated at 4a, so as to allow the flow of insulating oil or gas therethrough between the cable core and the housing 3.

The support 4 of Fig. 1 may constitute a single casting or it may comprise a series of separate members which together form the shape illustrated and which may be held together by a binding of insulation.

At its upper end the paper tube 2 is of a bell shape and is covered with a winding 13 of metallic wire that is electrically connected to the cable sheath. There is also provided a metallic end closure or bell 14 that is conventionally sealed with the cable sheath 15.

Fig. 2 shows another embodiment of the present invention. In this construction the cone 4' corresponds to the cone 4 previously described and may be of the same construction previously described. The sealing end of the high tension cable is provided with a stress control member 5 that is electrically connected to the cable conductor. The stress control member comprises a dielectric mass in which a ring 6 of metal or other conducting material is embedded by casting the dielectric mass around the ring 6. The composition of the dielectric mass and of the cone 4' is the same as that of the cone 4 and the sleeve 10 previously described. The stress control electrode may be of the structure and composition shown in my pending application Serial No. 550,741 or application Serial No. 424,729, to which reference is hereby made. The lower end of the insulating sleeve 2 is shaped to correspond with the shape of the upper inner end of the stress control member and the inner end of the insulating cone 4'. The lower end of the insulating sleeve extends into the cone 4' and is supported by the cone 4' and the stress control member 5. The lower end of the stress control member is supported on the metallic threaded ring 7 as in Fig. 1. A conductor 11 connects the conductive member 6 and a closure plate 12 that fits over the ferrule 8 and seals the lower end of the insulator housing 3.

The assembly of the structures of Figs. 1 or 2 may be carried out in the following manner: The insulating sleeve 2, suitably tapered at its lower end, is applied to the cable core 1. The support 4 or 4' of the shape of a truncated cone is then inserted onto the end of the cable core 1, or if the support 4 or 4' is of several parts the portions constituting it are positioned around the bottom of the insulating sleeve 2 and bound together. Subsequently, the tube 10 in the case of Fig. 1, or the stress control member 5 in the case of Fig. 2, is positioned on the end of the cable, and the ring 7 is screwed on the ferrule 8. Finally, the insulating sleeve 2 at its upper end is given the bell-like shape, and the winding 13 of metallic wire having closely positioned turns is formed around the top of the sleeve 2 to constitute the stress control screening of the cable head at its entry into the sealing end. The screening wire 13 is grounded to the metallic cable sheath which is generally of lead or aluminium. Now the sealing end is ready to receive the insulator 3 with the rings that are cemented to the upper and lower ends thereof, together with the corresponding upper and lower closing plates that are secured to those rings with interposed gaskets, and the end cap 14, and then be filled with an insulating fluid as, for instance, oil or an insulating gas. The insulating end may then be positioned so that the insulator 3 enters through the top of a transformer casing into the transformer housing as is usual in the art.

As previously stated, the sleeve support 4 of Fig. 1, or 4' of Fig. 2, may be formed of several prefabricated pieces kept together by means of a binding of insulating material. This construction is illustrated in Figs. 3 and 4. In this construction there is shown at 24 a truncated cone which may take the place of the cone 4 of Fig. 1 or the cone 4' of Fig. 2. The truncated cone 24 is made of several prefabricated portions, in this instance three, indicated at 25, 26 and 27, each, in this instance, of identical construction and of the same insulating material as previously described in connection with the cone 4 or 4' of Figs. 1 and 2 and made by the method of my application Serial No. 550,741, with or without an internally embedded porous insulating structure acting as a skeleton, as previously referred to. Each portion is, in this instance, of the shape of one-third of the ultimate cone. The three portions 25, 26 and 27 are held together by upper and lower bindings 28 and 29 of insulating tape or cord which are wound respectively in upper mating grooves 30 formed in the three cone portions and lower mating grooves 31 formed in the three cone portions. The three portions 25, 26 and 27 held together by the bindings 28 and 29 may be preassembled before the formation of the sealing end or, as is in many instances preferable, the three separate portions 25, 26 and 27 may be first assembled around the sealing end.

The support 4 of Fig. 1 or 4' of Fig. 2 may also constitute with the sleeve 10 of Fig. 1 or with the stress control member 5 of Fig. 2 a monolithic unit having a funnel-like shape.

The potential of the cable sheath is ground potential or substantially ground potential, the difference being that sometimes cable sheath sections are isolated to reduce sheath currents and therefore the potential of the sheath may be a very small number of volts above ground potential. For the present purposes, this small number of volts is insignificant in comparison with the potential of the cable conductor, and the cable sheath is therefore considered as being at ground potential.

While I have here shown and described a few preferred embodiments of my invention, it is, however, to be understood that the same is merely illustrative. What I consider new and desire to secure by Letters Patent is:

1. An improvement in the construction of a sealing end for a high tension cable having a cable core, said sealing end having a vertically extending insulator into which the cable core enters from the top and extends downwardly towards the bottom, characterized in that an insulating sleeve surrounds the end of the cable core within the insulator, the lower end of said sleeve being shaped as a generally truncated cone, and there is provided a support against which the conical surface of the truncated conical end of the sleeve bears, said support being of rigid insulating material of a dielectric strength at least approximating that of the insulating sleeve and shaped as a generally truncated cone and into which the lower end of the sleeve extends and by which the conical surface of the sleeve is supported against downward movement, and means for supporting the support against downward movement.

2. An improvement in the construction of a sealing end for a high tension cable having a cable core impregnated with an insulating fluid, said sealing end having a vertically extending insulator into which the cable core enters from the top and extends downwardly towards the bottom, characterized in that an insulating sleeve surrounds the end of the cable core within the insulator, the lower end of said sleeve being shaped as a generally truncated cone, and there is provided a support against which the conical surface of the truncated conical end of the sleeve bears, said support being of rigid insulating material of a dielectric strength at least approximating that of the insulating sleeve and shaped as a generally truncated cone and into which the lower end of the sleeve extends and by which the conical surface of the sleeve is supported against downward movement, and means for supporting the support against downward movement, said support being perforated to allow the flow of insulating fluid therethrough to and from the cable sleeve.

3. An improvement in the construction of sealing ends as in claim 1, characterized in that the support of insulating material is a casting of synthetic resins preferably of the ethoxylinic type, with hardening agents and in case loaded with inorganic excipients.

4. An improvement in the construction of sealing ends as in claim 1, characterized in that the support of insulating material is a porous insulating structure, acting as a skelton which is impregnated with and embedded in synthetic resins preferably of the ethoxylinic type, added with hardening agents but devoid of inorganic fillers.

5. An improvement in the construction of sealing ends as in claim 1, characterized in that the insulating support is made of insulation selected from the group comprising bakelized cardboard, porcelain, and glass.

6. An improvement in the construction of a sealing end for a high tension cable through which electrical connections are made with the conductor of the cable core, said sealing end having an outer insulator into which the cable core enters at the top and through which it extends vertically towards the bottom, an outer metal flange terminating the bottom of the outer insulator, characterized in that an insulating sleeve surrounds the end of the cable core within the insulator and there is provided a support of rigid insulating material of a dielectric strength at least approximating that of the insulating sleeve and shaped as a generally truncated cone and into which the lower end of the sleeve extends and by which the sleeve is supported against downward movement, and means for supporting said truncated cone comprising a tube of rigid insulation surrounding the cable core and upon which the truncated cone rests, a ferrule on the end of the cable conductor and means for supporting the said tube comprising a metal ring screwed on the ferrule and surrounded by the outer metallic flange which terminates the outer insulator and which serves to screen the end of the terminal and which is at the same potential as the cable conductor.

7. An improvement in the construction of a sealing end for a high tension cable through which electrical connections are made with the conductor of the cable core, said sealing end having an outer insulator into which the cable core enters at the top and through which it extends vertically towards the bottom, characterized in that an insulating sleeve surrounds the end of the cable core within the insulator and there is provided a funnel shaped support of rigid insulating material of a dielectric strength at least approximating that of the insulating sleeve and into which the lower end of the sleeve extends and by which the sleeve is supported against downward movement, and means for supporting said support comprising a stress control electrode embedded in a mass of solid insulation, said electrode surrounding the cable core, and means for maintaining the electrode at the potential of the cable conductor.

8. A terminator for sealing the end of a high voltage electric cable and establishing electrical connections with the conductor thereof, said terminator comprising an outer housing of insulation having upper and lower open ends into one of which the cable conductor extends and at the opposite one of which the cable conductor ends, a sleeve of insulation surrounding the cable within the housing, an inner hollow truncated cone of rigid insulating material coaxial with the sleeve, the small diameter end of the support being adjacent to the end of the cable core within the terminator, and said cone flaring outwardly from the end of the cable conductor towards the end of the terminator into which the cable core enters, one end of the sleeve extending into the inner cone and being supported thereby, and means supporting the small diameter end of the inner cone within the outer housing and thereby supporting the sleeve.

9. A terminator for sealing the end of a high voltage electric cable and establishing electrical connection with the conductor thereof, said terminator comprising an outer housing of insulation having vertically aligned upper and lower open ends into one of which the cable core extends and at the opposite one of which the cable core ends, the housing being at ground potential at said one end thereof and at the cable conductor potential at the opposite end, a sleeve of insulation surrounding the cable core within the the housing, an inner hollow truncated cone of rigid insulating material coaxial with the sleeve, one end of the sleeve extending into the inner cone and being supported thereby, and means supporting the smaller diameter end of the inner cone within the housing and thereby supporting the sleeve, said last means including rigid insulation surrounding the cable core and interposed between the smaller diameter end of the inner cone and the parts of the terminator which are at the potential of the cable conductor, the smaller diameter end of the inner cone being held against vertical movement by said last mentioned rigid insulation, the housing having a filling of fluid insulation and said inner cone being perforate to allow the flow of insulating fluid to the insulating sleeve.

10. A terminator for sealing the end of a high voltage electric cable and establishing electrical connections with the conductor thereof, said terminator comprising an outer housing having upper and lower ends insulated from each other and into one of which the cable core extends and at the opposite one of which the cable core ends, a sleeve of insulation surrounding the cable core within the housing, an inner hollow truncated cone of rigid insulating material coaxial with the sleeve, the lower end of the sleeve being tapered to the shape of and extending into the inner cone and being supported thereby, and means supporting the lower end of the inner cone within the housing, said last means including a tube of rigid insulation surrounding the cable core and interposed between the smaller diameter end of the inner cone and the parts of the terminator which are at the potential of the cable conductor and being at its lower end at the potential of the cable conductor, the lower end of the inner cone being held against vertical movement by said last mentioned tube of rigid insulation.

11. A terminator for sealing the end of a high voltage electric cable and establishing electrical connections with the conductor thereof, said terminator comprising an outer housing having upper and lower ends insulated from each other and into one of which the cable core extends and at the opposite one of which the cable core ends, a sleeve of insulation surrounding the cable core within the housing, an inner hollow truncated cone of rigid insulating material coaxial with the sleeve, the lower end of the sleeve being tapered to the shape of and extending into the inner cone and being supported thereby, and means supporting the lower end of the inner housing within the outer cone, said last means including a mass of rigid insulation surrounding the cable core and a stress controlling conductive ring embedded in said mass and electrically connected to parts of the terminator which are at the potential of the cable conductor, the lower end of the inner cone being held against vertical movement by said last mentioned rigid insulation.

12. A stress control member for use with a high voltage cable, said member comprising a body of rigid insulation of the shape of a hollow truncated cone having at its smaller diameter end a sleeve of insulation coaxial therewith, a stress control conductive ring embedded in the sleeve, a conductive lead extending from the ring to the outside of the sleeve, the insulation of the sleeve being devoid of voids therein and being in intimate adherence with the surface of the ring.

13. A stress control member for use with a high voltage cable, said member comprising a body of rigid insulation of the shape of a hollow truncated cone having at its smaller diameter end a sleeve of insulation coaxial therewith, the cone being perforated to permit the passage of insulating fluid through the wall thereof, a stress control conductive ring embedded in the sleeve, a conductive lead extending from the ring to the outside of the sleeve, the insulation of the sleeve being devoid of voids therein and being in intimate adherence with the surface of the ring.

14. An improvement in the construction of a sealing end for a high tension cable having a cable core, said sealing end having a vertically extending insulator into which the cable core enters from the top and extends downwardly towards the bottom, characterized in that an insulating sleeve surrounds the end of the cable core within the insulator, and there is provided a funnel-shaped support of rigid insulating material of a dielectric strength at least approximating that of the insulating sleeve and into which the lower end of the sleeve extends and by which the sleeve is supported against downward movement, said support comprising several prefabricated portions and a binding of insulating material holding said portions together and said support including a metallic tubular base for the apex of the funnel which base is coaxial with the longitudinal axis of the funnel shaped support; and means for electrically screening the said tubular base, said last means comprising an outer metal flange which terminates the outer insulator and which is electrically in contact with the cable conductor maintaining at least a portion of the tubular base at the potential of the cable conductor.

15. A structure such as defined in claim 8 wherein the means for supporting the small diameter end of the inner cone comprises a body of rigid insulation surrounding the cable conductor and interposed between the lower end of the inner cone and the parts of the terminator which are at the potential of the lowermost end of the housing, and the said body of rigid insulation being, at its lower end, at the potential of the housing, the lower end of the inner cone being held against vertical movement by said last mentioned rigid insulation.

References Cited in the file of this patent

UNITED STATES PATENTS

| | | |
|---|---|---|
| 1,129,486 | Harris | Feb. 23, 1915 |
| 1,878,169 | Myers | Sept. 20, 1932 |
| 1,950,608 | Hanson | Mar. 13, 1934 |
| 2,174,377 | Bowden et al. | Sept. 26, 1939 |
| 2,474,930 | Brazier et al. | July 5, 1949 |
| 2,727,938 | Nicholas | Dec. 20, 1955 |
| 2,827,508 | Roehmann | Mar. 18, 1958 |

FOREIGN PATENTS

| | | |
|---|---|---|
| 476,408 | Great Britain | Dec. 8, 1937 |
| 524,989 | Great Britain | Aug. 20, 1940 |
| 167,048 | Australia | Pub. June 10, 1954 |